United States Patent
Rogge et al.

(10) Patent No.: US 11,858,347 B2
(45) Date of Patent: Jan. 2, 2024

(54) METHOD FOR VISUALISING SENSOR DATA AND/OR MEASUREMENT DATA

(71) Applicant: DAIMLER AG, Stuttgart (DE)

(72) Inventors: Klaus Rogge, Sindelfingen (DE); Daniela Knapp, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 871 days.

(21) Appl. No.: 16/772,427

(22) PCT Filed: Dec. 5, 2018

(86) PCT No.: PCT/EP2018/083686
§ 371 (c)(1),
(2) Date: Jun. 12, 2020

(87) PCT Pub. No.: WO2019/115318
PCT Pub. Date: Jun. 20, 2019

(65) Prior Publication Data
US 2021/0070173 A1  Mar. 11, 2021

(30) Foreign Application Priority Data
Dec. 13, 2017  (DE) ...................... 10 2017 011 499.4

(51) Int. Cl.
*B60Q 3/80* (2017.01)
*B60K 35/00* (2006.01)
(Continued)

(52) U.S. Cl.
CPC ................ *B60K 35/00* (2013.01); *B60Q 3/20* (2017.02); *B60Q 3/66* (2017.02); *B60Q 3/745* (2017.02);
(Continued)

(58) Field of Classification Search
None
See application file for complete search history.

(56) References Cited

U.S. PATENT DOCUMENTS 9,358,922 B2   6/2016   Rogge
9,836,656 B2  12/2017   Langenberg
(Continued)

FOREIGN PATENT DOCUMENTS

DE   102008002560 A1   12/2009
DE   102011121392 A1    6/2013
(Continued)

OTHER PUBLICATIONS

Machine translation of WO2014/040714. (Year: 2014).*
(Continued)

*Primary Examiner* — James M McPherson
(74) *Attorney, Agent, or Firm* — PATENT PORTFOLIO BUILDERS PLLC

(57) ABSTRACT

A method for visualizing sensor data from the surroundings of a vehicle and/or measuring data from the vehicle uses light modules in the interior of the vehicle for the visualization of the sensor data. The sensor data is detected as video data, after which the video data is analyzed in relation to relevant recognizable structures, after which the relevant structures are transferred to a video sequence with a format fitting for the respective light module, and/or sensor data not detected as video data and/or measuring data is recalculated into video sequences via an algorithm, after which the video sequences from the different data are superimposed and displayed on the light modules.

9 Claims, 2 Drawing Sheets

Figure 1:
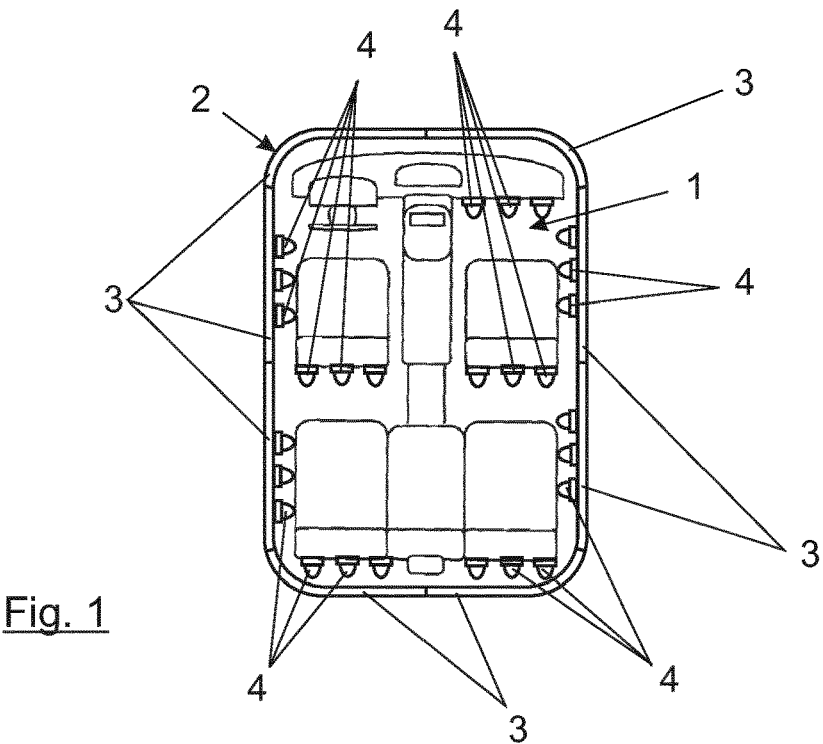

(51) Int. Cl.
  *B60Q 3/20* (2017.01)
  *B60Q 3/74* (2017.01)
  *B60Q 3/66* (2017.01)

(52) U.S. Cl.
  CPC .......... *B60Q 3/80* (2017.02); *B60K 2370/176* (2019.05); *B60K 2370/1868* (2019.05); *B60K 2370/193* (2019.05); *B60K 2370/33* (2019.05)

(56) References Cited

U.S. PATENT DOCUMENTS

| | | | |
|---|---|---|---|
| 10,322,670 | B2 | 6/2019 | Mueller et al. |
| 2011/0157184 | A1 | 6/2011 | Niehsen et al. |
| 2019/0156666 | A1 | 5/2019 | Beckmann et al. |

FOREIGN PATENT DOCUMENTS

| | | |
|---|---|---|
| DE | 102012223588 A1 | 6/2014 |
| DE | 102013003266 A1 | 8/2014 |
| DE | 102013206435 A1 | 10/2014 |
| DE | 102015221180 A1 | 5/2017 |
| DE | 102016004175 A1 | 10/2017 |
| EP | 2073185 A2 | 6/2009 |
| WO | 2014040714 A1 | 3/2014 |

OTHER PUBLICATIONS

Office Action created Apr. 1, 2022 in related/corresponding De Application No. 10 2017 011 499.4.
Examination Report created on Sep. 27, 2018 in related/corresponding DE Application No. 10 2017 011 499.4.
International Search Report dated Apr. 8, 2019 in related/corresponding International Application No. PCT/EP2018/083686.
Written Opinion dated Apr. 8, 2019 in related/corresponding International Application No. PCT/EP2018/083686.

\* cited by examiner

METHOD FOR VISUALISING SENSOR DATA AND/OR MEASUREMENT DATA

BACKGROUND AND SUMMARY OF THE INVENTION

Exemplary embodiments of the invention relate to a method for visualizing sensor data from the surroundings of a vehicle and/or measuring data from the vehicle by means of at least one light module in the interior of the vehicle. Moreover, exemplary embodiments of the invention relate to a device for carrying out this method.

DE 10 2016 004 175 A1 describes a driver assistance system for a vehicle. Here, the processing of the sensor data and a display device is elementary for depicting the processed sensor data. This is substantially designed as a light band surrounding the entire interior of the vehicle. This light band can, for example, be part of a so-called ambient interior illumination of the vehicle, in which an interior illumination of the vehicle is carried out via individual illumination elements. In an inherently known manner, this interior illumination can be adjusted in terms of brightness, the color and similar to various measuring data or can be programmed by a person using the vehicle corresponding to their mood. An adjustment of the interior illumination, for example to the kind of music being played or similar, is here generally known and possible.

Here, when using light modules, which form, for example, the light band described above in the prior art, the depiction of more complex contents, which symbolize corresponding measurements or sensor data, is possible.

In this context, DE 10 2015 221 180 A1 describes the application of a central light control device to a plurality of peripheral light control devices distributed in the vehicle, which each control a plurality of light sources of an ambient illumination. The construction with peripheral light control devices distributed in the vehicle here uses stored patterns in the region of these peripheral light control devices, in order to thus depict specific data and situations. The central control device must then only transfer a corresponding code for the respective pattern to the peripheral light control device. This is possible in a simple, efficient and quick manner via a conventional bus connection. Then, the dataset previously stored is accessed inside the periphery control device and correspondingly depicted via the ambient interior illumination. The disadvantage with this construction is that it can be only be operated with pre-stored courses for the illumination, such that different situations emerging in the traffic and different situations emerging in the vehicle can only be responded to conditionally, since it is impossible for all conceivable situations to be taken into consideration via the light patterns adjusted thereto and correspondingly stored in the periphery light control devices. A reaction to results actually emerging in real time is thus factually not possible.

Exemplary embodiments of the present invention are directed to further improving a method for visualizing sensor data and/or measuring data by means of light modules in the interior of the vehicle and to a device suitable for carrying out the method, which enables a quick and efficient implementation of the visualization on the light modules.

In the method according to the invention it is such that the sensor data is detected as video data for visualizing the sensor data or measuring data by means of the light modules in the interior of the vehicle, for example by a surroundings camera in the vehicle. This surroundings camera, or further sensor data, e.g., radar objects, vehicle states, e.g., recuperation, speech inputs via SDS, can be present, in any case, for the control of driver assistance systems, or can also be provided for the method according to the invention in the vehicle. Here, the camera can be a single camera or a plurality of cameras. These can detect individual or common images from the surroundings of the vehicle, in particular 360° images from the entire surroundings of the vehicle. The detected video data is then analyzed in terms of relevant recognizable structures. This analysis enables a reduction of the course of the individual image sequences for the control of the light modules to individual pieces of information. Here, in particular, the contents that are interesting to the person using the vehicle can be worked out, for example objects moving in the direction of the vehicle or similar. For this, different kinds of image processing algorithms can be used, which work out these relevant recognizable structures based on colors, image sectors, speeds and/or contrasts.

The relevant structures are then transferred to a video sequence with the format fitting for the respective light module. Depending on the light module used, here, in particular analogously to the prior art mentioned above, light bands can be used in the interior of the vehicle, the resolution is usually only a few individual illuminated dots, for example at the height of the light module. The video data can thus not simply be played as a "film". Thus, the relevant structures are worked out and transferred to a format appropriate for the respective light module to be able to display via characteristic structures.

Alternatively or, in particular, additionally, sensor data not detected as video data, for example by the surroundings sensor of the vehicle, but also by interior sensors or by sensors which detect corresponding settings, for example, of the air conditioning system, can be processed. In turn, additionally or alternatively to this sensor data, measuring data can also be processed, which can come from the region of the telematic system of the vehicle, for example. Here, sensor data and measuring data can overlap in terms of content, wherein this is less significant for the invention present here. Based on this sensor data and/or measuring data, which is not present as video data, a video sequence fitting for the respective light module in terms of the format or resolution can also be calculated via suitable algorithms. Thus, certain measurements can be converted from the telematic system of the vehicle or from the driver assistance system via suitable algorithms into video sequences analogously characteristically rendering the data.

The video sequences from the video data, on one hand, and from the measuring data and/or sensor data, on the other hand, are then superimposed on one another and correspondingly depicted as an entire video sequence on the light modules. Thus, the current situation is always epitomized on the light modules via the depiction of the data, such that this can be intuitively detected by a person using the vehicle.

In contrast to the prior art mentioned at the above, the underlying data here comes from the direct detections of the sensors or from the directly determined measuring data and is processed in a very up-to-date manner and transferred to the video sequences. The visualization via the video sequences on the light modules thus reproduces the current situation and, in particular, can depict situations that thus emerge and had not emerged before in which video sequences not pre-stored can be drawn on.

According to an advantageous development of the invention, the video sequences are here displayed on light modules as live data. This implementation of the video sequences as live data requires a correspondingly high output when processing the video data or calculating video sequences from the sensor data and/or measuring data. The visualization of the received data "live" on the light modules of the vehicle, however, is a definite asset for the person using the vehicle, since, in addition to their perception of the surroundings, the visualization in the light modules simultaneously takes place, which is particularly advantageous for the improved perception and for sharpening the attentiveness, since a temporal offset here would rather distract or confuse the person using the vehicle.

The use of live data also has the following advantages: In doing so, a flexible reaction to the measuring data can be carried out even when the controlling systems are or were modified by clients by selling/upgrades.

In addition, the system/system interfaces can then also be formed flexibly or amendably.

A further very advantageous embodiment of the method according to the invention moreover provides that, in addition to the light modules, ambient illumination elements are provided in the vehicle, which are controlled depending on the video sequences displayed in the light modules. The light modules are, in particular, only one part of the so-called ambient interior illumination of the vehicle. The vehicle has further illumination elements for the ambient interior illumination, for example light emitting diodes that can be controlled in terms of their color and intensity, which are distributed in a greater number across different regions of the vehicle, in particular in such a way that they provide an indirect illumination. These illumination elements can also now be correspondingly controlled according to the described advantageous development of the method according to the invention depending on the video sequences, such that a coherent overall image of the illumination is achieved in order to thus enable the positive perceptibility for a person controlling the vehicle or person using the vehicle as an accompanying person.

A very favorable design of the method according to the invention further provides that the superimposition of the video sequences takes place depending on a prioritization of the data sources underlying them. The video sequences can thus be superimposed in a correspondingly prioritized or weighted manner, such that certain video sequences are weighted more greatly and are more striking or more easily perceptible, for example because of a higher light intensity or stronger contrasts in the superimposed overall image of the video sequences. This has the advantage that the display of the video sequences is dynamically possible, and the video sequences can spontaneously react to changes in the surroundings. Video sequences, which are based on data, which has been generated, for example, by sensors relevant to safety or measurement probes, for example in the region of objects detected in the surroundings of the vehicle such as obstacles, for example, or similar, are evaluated to be correspondingly higher than measuring data or sensor data, for example, from a comfort control of the vehicle, i.e., for example from the region of an air conditioning system, a system for playing media or similar.

In addition to the current generation of the video sequences, for certain always repeating situations, in particular such video sequences pre-stored from the region of the comfort control or the telematics system, in addition to the currently generated video sequences, can be accessed from the storage and superimposed with the other video sequences. For certain situations, which actually repeat again and again in the same manner, a pre-stored video sequence or one that can be updated by the user when sold, can thus be used in order to reduce the computational cost. This optional pre-stored video sequences can here be stored, in particular, for clearly identical situations, which have been detected by the sensor data or measuring data. For example, this can relate to warning signals from the vehicle, such as a seatbelt that has not been done up, a door that is not completely closed or similar. It is also conceivable, for example at temperatures, to visualize certain settings of the air conditioning system or similar. For situations detected in the surroundings of the vehicle via the sensor data, in particular video data, in practice, storage will instead play a subordinate role since here the situations will, in practice, be very rarely repeated in the exactly identical manner.

The method according to the invention can now further provide that if the pre-stored video sequences about certain sensor data and/or measuring data are accessed from a storage, new video sequences detected by means of sensor data and/or measuring data and generated or calculated via the algorithm are saved in this storage as pre-stored video sequence, when they are based on characteristic sensor data and/or measuring data whose reoccurrence is to be expected. Thus, current video sequences can also be stored for the future as pre-stored video sequences via the storage. Here, existing video sequences can be overwritten, and new video sequences can be stored when certain situations are to be expected to occur identically more often. The system can thus quasi "learn" certain things in order to thus save computational costs in identical situations in the future and to then be able to access newly pre-stored video sequences.

The video sequences for controlling or for its depiction in the individual light modules can here be transferred directly to the light modules or according to a very favorable embodiment of the method according to the invention via a transducer, via which the light modules are controlled. Such a transducer, which is also referred to in software technology as an overlaying/blending algorithm, makes it possible to implement at light modules, for example of different lengths, such that the video sequences are always repeated in the same manner at this transducer, which it then adjusts correspondingly to the hardware to the light modules. Thus, an always comparable depiction of the individual light modules, even when these should have different resolutions, is guaranteed.

The device according to the invention for carrying out the method described above in one or more of the embodiment variants described provides that the ambient vehicle illumination comprises at least light modules in the vehicle. The whole video sequences are generated from the superimposition for the individual light modules via a central control device, which is formed to generate the video sequences from the sensor data and/or measuring data and which is further formed for the superimposition of the video sequences. Here, the central control device is connected to the light modules directly via a solitary high-speed bus or indirectly via the transducer discussed above according to an advantageous development of the method. The central control device thus processes the data and superimposes the video sequences with one another. It is thus able to transfer the video sequences to the light modules via a solitary high-speed bus, for example a high-speed CAN-FD bus, such that a display is possible virtually in real time. In doing so, the live depiction, described above and connected to the corresponding advantages, of the video sequences is made possible depending on the sensor data and/or measuring data.

As already mentioned, the light modules can be formed according to an advantageous development as a peripheral light band in the vehicle. Such a peripheral light band, as is known, in principle, from DE 2016 004 175, is suitable, in particular in order to display the video sequences based on the sensor data and/or measuring data in the direction of the person using, in particular controlling, the vehicle, in which this data is relevant, for example in order to ensure an alignment with the traffic surrounding the vehicle.

A very advantageous embodiment of the device according to the invention furthermore provides that the ambient vehicle illumination comprises ambient illumination elements in addition to the light modules, which are connected to a base control device, which has a data connection to the central control device. Such a base control device for the ambient illumination is thus always present, in principle, for an ambient illumination. In this advantageous development of the embodiment, according to the invention, of the device, this base control device now has a data connection to the central control device. In doing so, it is possible, as has already been indicated above in the method, that data is exchanged between the central control device and the base control device. Thus, the illumination elements of the ambient illumination, which are present in addition to the light modules, are adjusted correspondingly to the video sequences, which are displayed on the light modules, in order to thus achieve a coherent overall mood in the ambient interior illumination of the vehicle.

An advantageous development of the device according to the invention can moreover provide that a storage for pre-stored video sequences is provided in the central control device or connected directly to it. As a result of the direct attachment of the storage for the pre-stored video sequence, here a quick, fast and efficient incorporation of these pre-stored video sequences into the superimposition of all video sequences inside the central control device is guaranteed, which the data can then transfer correspondingly quickly via the solitary high speed bus, which is provided exclusively for the video data. This is also a great advantage for the visualization of the sensor data and/or measuring data via the video sequences without a recognizable time delay for the person using the vehicle.

Further advantageous embodiments of the idea also emerge from the exemplary embodiment, which is depicted below in more detail with reference to the figures.

BRIEF DESCRIPTION OF THE DRAWING FIGURES

Figure 2:
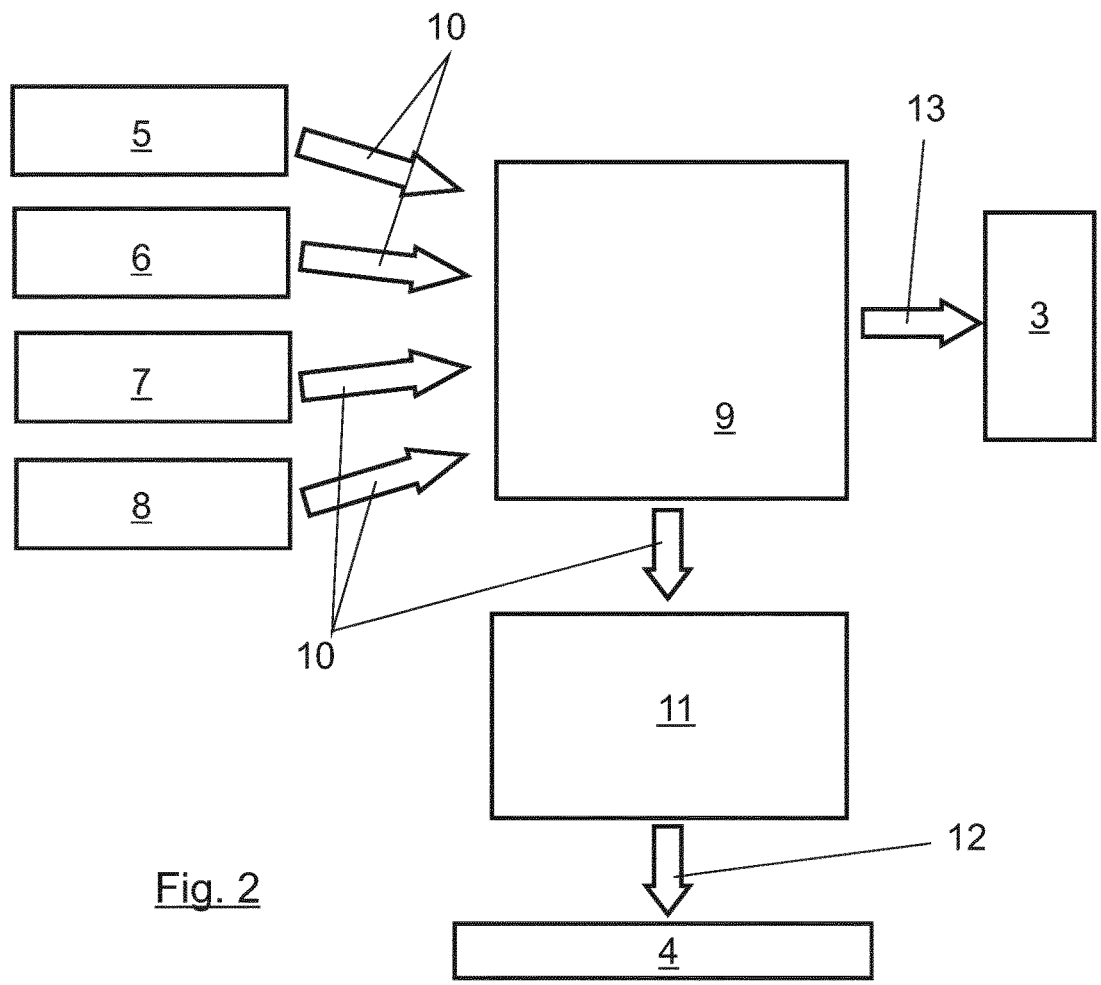
Figure 3:
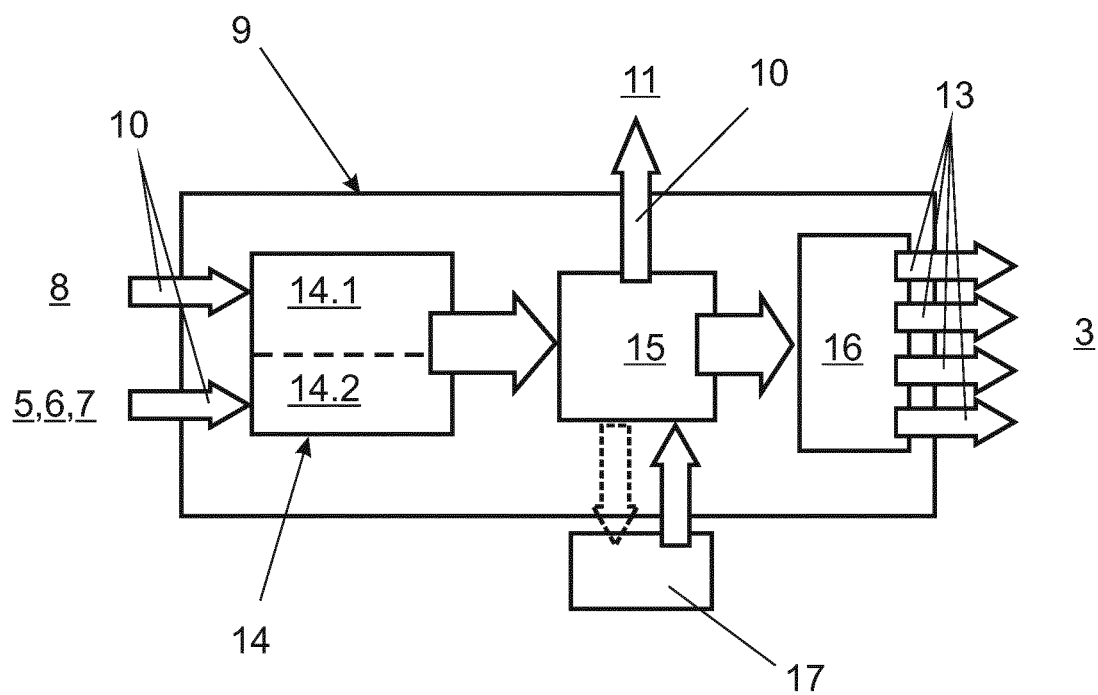

Here are shown:

FIG. 1 a principle depiction of the interior of a vehicle having an ambient interior illumination;

FIG. 2 a control architecture as the device for carrying out the method; and FIG. 3 a visualization of the courses in the central control device.

DETAILED DESCRIPTION

FIG. 1 illustrates the interior 1 of a vehicle (not depicted in its entirety). This interior 1 of the vehicle has an ambient vehicle illumination or ambient interior illumination. In the exemplary embodiment depicted here, this comprises a light band labelled with 2, which is formed peripherally around the interior 1 of the vehicle. This light band 2 can be divided, in particular, into several individual light modules, for example eight individual light modules, which are here each labelled with 3. The ambient interior illumination of the vehicle further comprises a plurality of individual ambient illumination elements 4, which can be formed, for example, as light-emitting diodes for the indirect illumination, for example, of the footwell. In the depiction of FIG. 1, only some of these ambient illumination elements are provided with the reference numeral 4. In total, here up to 150 individual light emitting diodes that can be controlled in terms of their color and light intensity, for example, can be provided as the illumination elements 4. The vehicle further comprises various sensor and measurement receivers, whose data is to be visualized, in particular via the light modules 3 of the peripheral light band 2.

In the depiction of FIG. 2, various groups of sensors and measurement receivers are illustrated. Thus, all the sensors relating to comfort and measurement receivers are to be compiled, for example, via the box labelled with 5. These can detect settings, for example, inside the interior 1 of the vehicle, in particular settings of an air conditioning system, a sound system, a seat heater, a setting of the seat or similar. In box 6, sensors of the driver assistance system are compiled, which recognize objects in the surroundings of the vehicle, for example, which recognize other vehicles, which recognize the deviation of the vehicle from a driving track, and similar. The sensors compiled in the box 6 are, moreover, extended by a camera, which is correspondingly symbolized by box 8 and which can be part of the sensor technology of the driver assistance system throughout. Furthermore, measurements and sensor data from the region of the telematics system 7 are indicated by box 7. All this data is transferred to a central control device 9 via a data connection, for example via an ethernet bus, which is indicated here and labelled with 10.

For its part, the central control device 9 is connected to a base control device 11 for the ambient vehicle illumination via the ethernet bus 10. A control of the individual illumination elements in terms of color and intensity depending on the location at which the individual illumination elements 4 are arranged can be carried out via a linear bus 12 for up to 150 illumination elements 4, for example, that can be individually addressed via this control device 11 for the ambient illumination of the vehicle interior 1.

Moreover, the central control device 9 is connected to the individual light modules 3, here thus the eight light modules 3 of the light band 2, via a solitary high-speed CAN-FD bus as a video link. In doing so, it is possible to very quickly control up to 100 LEDs, for example, per light module 3 in a single or multi-line video display.

The central control device 9 now substantially assumes three different tasks, which are schematically indicated in the depiction of FIG. 3. The data reaches the region of the central control device 9 via the ethernet bus 10 and here initially a unit divided into two blocks 14.1 and 14.2 for the video processing. In this unit 14, which can also be referred to as a video processor, the data, for example, is processed corresponding to the at least one camera 8 in order to analyze the video data according to relevant recognizable structures based on colors, image sectors, speeds and contrasts and to access the information in relation to the temporal duration of the individual image frequencies. The data is then processed for the control of the light modules 3 and utilized, in particular by it being adjusted to the depiction format of the respective light modules 3, for example a single-line video display having up to 100 columns. Finally, the interesting contents of the video data received are then thus determined in the region 14.1 of the video processor 14.

Moreover, it is thus that, as already mentioned, data from the region also processes comfort (5), driver assistance (6) and telematics (7) via the ethernet bus 10. This data can also be processed as needed via algorithms in video sequences, which are each formatted to be adapted to the control of the individual light modules 3 of the light band 2. The video sequences from the video processor 14 then reach a video parser 15 in which they are superimposed. The whole superimposition of the videos, for example the superimpositions of up to five individual videos, which have been compiled from different data sources in the regions 14.1 and/or 14.2 of the video processor 14, can thus be superimposed in a priority-controlled manner in relation to an overall video sequence. The priority control is useful here in order prioritize information relevant to safety more highly and to weight it more highly than information relevant to comfort. In doing so, an overall video emerges which can, in principle, make all information relevant, which, however, prioritizes information more important to the user of the vehicle more highly and thus makes it easier to recognize by means of a corresponding choice light intensities and contrasts in the whole video. The data of this whole video is then transferred directly or, as in the exemplary embodiment depicted in FIG. 3, via a transducer 16, which is also referred to as a mapper, to the eight light modules 3. The solitary high-speed CAN-FD bus already discussed can be designed for this, for example in the form of four CAN-FD buses, which each control two of the light modules 3. In doing so, it is possible to transfer the video sequences virtually in real time to the light modules 3 and thus to achieve a live display of the sensor data and measurements received by means of the video sequences in the individual light modules 3 of the light band 2.

The transducer or mapper 16 quasi "maps" the individual video pixel of the whole video coming from the video parser 15 onto the individual light modules 3 or the CAN-FD busses 13 allocated to them. In doing so, light modules of different lengths can also be controlled without the video sequences having to already take this into consideration. The individual video pixels of the whole video are thus directly prepared for the light modules 3 via the central control device 9 with the mapper 16, such that the light modules 3 can be conceived overall exceptionally simply.

Optionally, an external storage 17 can also be provided which is arranged in the central control device 9 or is directly connected to this. This central storage 17 can comprise pre-stored video sequences, which, in certain situations can be detected by sensor data and/or measuring data, make a useful visualization of this data possible. In this case, the computational cost in the portion 14.2 of the video processor 14 is saved. Here, these videos from the storage 17 are also superimposed in to the video parser 15 in addition to the other videos. This is correspondingly indicated in the depiction of FIG. 3.

Moreover, a newly generated video sequence can be stored in the storage 17 via the video parser 15 or also via the video processor 14 in order to be able to use them as the pre-stored video sequence at a future point in time.

Moreover, the central control device 9 is connected to the base control device 11 via the ethernet bus 10, as also correspondingly emerges from the depiction of FIG. 2. The data from the central control device 9, and, here in particular the data in relation to the whole video from the video sparser 15, can thus be transmitted to the base control device 11. This is then able to adjust the individual illumination elements 4 of the ambient interior illumination in terms of their color and light intensity at the respective location to the whole video sequence running in the region of the light band 2, in order to thus obtain a coherent overall image of the interior illumination and to transmit the desired information intuitively to the person using the vehicle.

Of course, the mapper 16 can also be dispensed with when a corresponding processing of the video sequences has already been carried out in the region of the video processor 14 and the whole video in the video parser 15. The data can then be transferred directly from the video parser 15 to the individual light modules 3, in particular when these are formed identically one below the other and have the same measurements and pixel resolution.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for visualizing sensor data from the surroundings of a vehicle or measuring data from the vehicle, wherein the sensor data is visualized using light modules in an interior of the vehicle, the method comprising:
   detecting the sensor data, wherein the detected sensor data includes as-video data from a camera of the vehicle and additional sensor data or measuring data from at least one additional sensor, wherein the at least one additional sensor detects settings inside of an interior of the vehicle, is a sensor of a driver assistance system of the vehicle other than the camera, or is a sensor of a telematics system of the vehicle;
   analyzing the video data to identify recognizable structures;
   transferring the recognizable structures to a video sequence with a format for the light modules in the interior of the vehicle or recalculating sensor data not detected as video data or measuring data into a video sequence using an algorithm;
   requesting, from a storage in the vehicle and based on the additional sensor data or the measuring data from the at least one additional sensor, pre-stored video sequences; and
   superimposing the video sequence with the pre-stored video sequences and displaying the video sequence superimposed with the pre-stored video sequences using the light modules.

2. The method of claim 1, wherein the video sequence is displayed using the light modules as live data.

3. The method of claim 1, wherein the vehicle interior further comprises ambient illumination lights, which are controlled depending on the video sequence displayed using the light modules.

4. The method of claim 1, wherein the superimposition of the video sequence is performed depending on a prioritization of a sources of the sensor data.

5. The method of claim 1, wherein the light modules are controlled by a transducer.

6. A device for visualizing sensor data from the surroundings of a vehicle or measuring data from the vehicle, wherein the sensor data is visualized using light modules in an interior of the vehicle, the device comprising:
- an ambient vehicle illumination, which comprises the light modules;
- a plurality of sensors configured to detect the sensor data, wherein one of the plurality of sensors is a camera that captures as video data as the sensor data, wherein a second one of the plurality of sensors is configured to detect settings inside of an interior of the vehicle, is a sensor of a driver assistance system of the vehicle other than the camera, or is a sensor of a telematics system of the vehicle;
- a storage configured to store pre-stored video sequences related to additional sensor data or measurement data from the second one of the plurality of sensors; and
- a central controller configured to
  - analyze the video data to identify relevant recognizable structures;
  - transfer the recognizable structures to a video sequence with a format for the light modules in the interior of the vehicle or recalculate sensor data not detected as video data or measuring data into a video sequence using an algorithm; and
  - superimpose the video sequence with the pre-stored video sequences,
- wherein the light modules are configured to display the video sequence superimposed with the pre-stored video sequences using the light modules,
- wherein the central controller is directly or indirectly connected to the light modules using a solitary high-speed bus,
- wherein the storage is in the central controller or is directly connected to the central control device.

7. The device according to claim 6, wherein the light modules are a light band on a periphery of the interior of the vehicle.

8. The device according to claim 6, wherein the ambient vehicle illumination comprises further comprises ambient illumination elements, the ambient illumination elements are to a base controller that has a data connection to the central controller.

9. The method of claim 1, wherein when the storage in the vehicle does not have pre-stored video sequences for the sensor data or the measuring data from the at least one additional sensor, the method further comprises:
- generating, using the algorithm, a new video sequence; and
- storing the new video sequence in the storage as one of the pre-stored video sequences.

* * * * *